United States Patent
Makishima

(10) Patent No.: US 7,599,722 B2
(45) Date of Patent: Oct. 6, 2009

(54) MOBILE CAMERA PHONE WITH ADJUSTABLE FOCAL LENGTH

(75) Inventor: Sugio Makishima, Minato-ku (JP)

(73) Assignee: FUJIFILM Corporation, Tokyo (JP)

( * ) Notice: Subject to any disclaimer, the term of this patent is extended or adjusted under 35 U.S.C. 154(b) by 487 days.

(21) Appl. No.: 10/730,945

(22) Filed: Dec. 10, 2003

(65) Prior Publication Data
US 2004/0116166 A1 Jun. 17, 2004

(30) Foreign Application Priority Data
Dec. 13, 2002 (JP) .............................. 2002-362001

(51) Int. Cl.
*H04M 1/00* (2006.01)
(52) U.S. Cl. .............. 455/575.3; 455/550.1; 455/556.1; 396/90; 396/91; 396/357; 396/360
(58) Field of Classification Search .............. 455/550.1, 455/556.1, 575.3; 396/90–92, 357, 360–362, 396/366, 367, 378–379
See application file for complete search history.

(56) References Cited

U.S. PATENT DOCUMENTS

| 5,950,020 | A | * | 9/1999 | Ball et al. ...................... 396/73 |
| 6,965,413 | B2 | * | 11/2005 | Wada .......................... 348/376 |
| 2002/0061767 | A1 | * | 5/2002 | Sladen et al. ................ 455/556 |
| 2002/0077145 | A1 | | 6/2002 | Kamiya et al. |
| 2003/0040346 | A1 | * | 2/2003 | Fukuda et al. ............... 455/575 |
| 2004/0072589 | A1 | * | 4/2004 | Hamamura et al. ....... 455/550.1 |
| 2004/0092284 | A1 | * | 5/2004 | Satoh et al. ............... 455/550.1 |
| 2006/0229118 | A1 | * | 10/2006 | Kaneko .................... 455/575.3 |

FOREIGN PATENT DOCUMENTS

| JP | 03-063131 | 6/1991 |
| JP | 05-06438 U | 1/1993 |
| JP | 06-289474 | 10/1994 |
| JP | 3074054 U | 10/2000 |
| JP | 3085476 U | 2/2002 |
| JP | 2002-185589 A | 6/2002 |
| JP | 2002-325124 | 11/2002 |
| JP | 2003-069869 | 3/2003 |
| JP | 2003-262908 | 9/2003 |
| JP | 2004-080343 | 3/2004 |

* cited by examiner

*Primary Examiner*—Edward Urban
*Assistant Examiner*—Fayyaz Alam
(74) *Attorney, Agent, or Firm*—Sughrue Mion, PLLC

(57) ABSTRACT

The portable terminal with camera comprises: a first housing and a second housing which are movably connected to each other; an image pickup device which is arranged in one of the first housing and the second housing; and a conversion lens which is arranged in the other of the first housing and the second housing. In a first state where the first housing and the second housing are laid on each other, the image pickup device and the conversion lens have an identical optical axis so that a focal length of the image pickup device is converted from a focal length in a second state where the first housing and the second housing are arranged to each other differently than the first state. Thus, the focal length can be converted using a simple arrangement, so as to easily switch between image-capturing of a distant object as with ordinary cameras and image-capturing of an operator's face or the like.

13 Claims, 7 Drawing Sheets

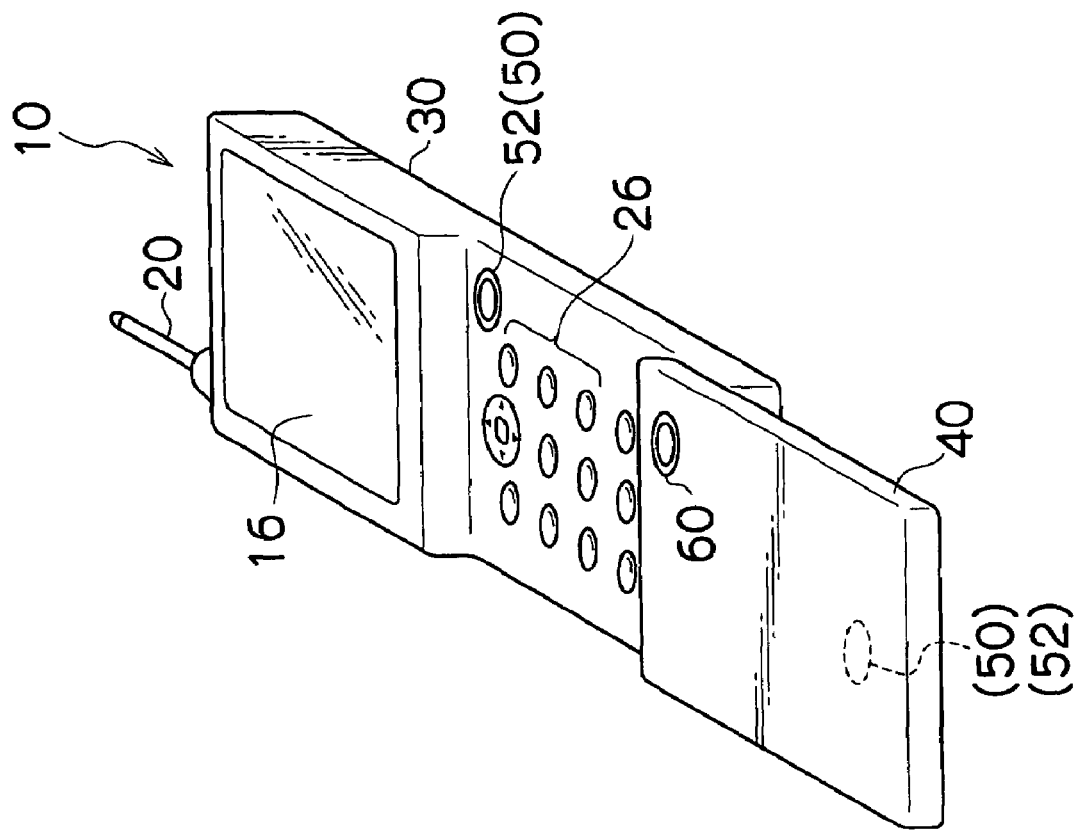
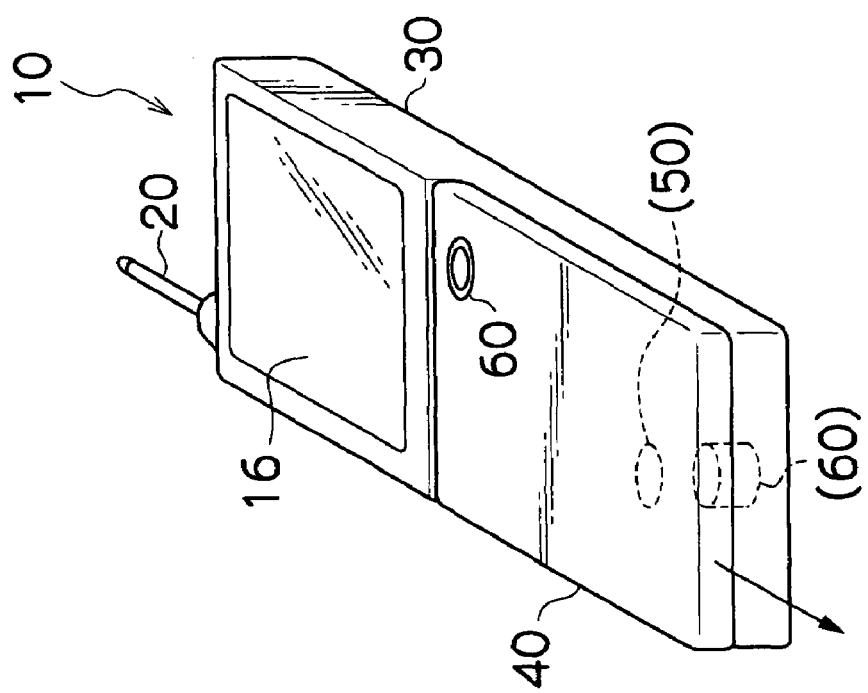

MOBILE CAMERA PHONE WITH ADJUSTABLE FOCAL LENGTH

BACKGROUND OF THE INVENTION

1. Field of the Invention

The present invention relates to a portable terminal with camera, and in particular, to a portable terminal with camera which allows the focal length of the camera to be selectively converted into one of a plurality of lengths.

2. Description of the Related Art

In recent years, portable terminals such as mobile telephones and Personal Digital Assistants (PDAs) have been popular. Some of these portable terminals are equipped with a digital camera to record captured images and/or to transmit captured images along with character and/or audio information.

It has been desired that the camera in the portable terminal not only captures an image of a distant object like ordinary cameras but also captures an image of the operator's (owner's) face or the like to record and/or to transmit captured images along with character and/or audio information. Accordingly, proposals have been made to allow for image-capturing in various directions.

For example, Japanese Utility Model Publication No. 3074054 discloses an arrangement in which a plug type camera is inserted into a jack provided on a side of a mobile telephone and is rotated to vary an image-capturing direction. Japanese Utility Model Publication No. 3085476 discloses another arrangement in which a close-up lens is connected to a camera of a mobile telephone to enable close-up image-capturing. Japanese Patent Application Publication No. 2002-185589 discloses still another arrangement in which a camera unit having a rotating mechanism is provided near an end of a mobile telephone to allow an image-capturing direction to be varied.

However, the conventional portable terminals with camera or the like do not deal properly with various focal lengths; with these portable terminals, it is not easy to switch between image-capturing of a distant object as with ordinary cameras and image-capturing of the operator's (owner's) face or the like. Specifically, when an image of the operator's (owner's) face or the like is captured, a wide-angle or close-up mode with a shorter focal length is desirably used. On the other hand, if an image of a distant object is captured as in the case with ordinary cameras, then in many cases, a standard or telephoto mode with a longer focal length is desirably used.

For example, the arrangement in Japanese Utility Model Publication No. 3074054 enables the image-capturing direction to be varied but fixes the focal length of a close-up lens. The arrangement in Japanese Utility Model Publication No. 3085476 has a close-up lens as a separate part. Accordingly, it is cumbersome to mount and remove the close-up lens, and the lens may be lost. The arrangement in Japanese Patent Application Publication No. 2002-185589 allows the image-capturing direction to be varied and serves to protect the lens, but fixes its focal length.

Although it has been desired that a portable terminal with camera allow various focal lengths to be used for image-capturing, the lens in the portable terminal with camera is often configured to have a single focal length; it does not have any movable parts so as not to degrade its durability or the like. Furthermore, if the focal length is varied, another lens as a separate part is required. Consequently, the above inconveniences may result.

SUMMARY OF THE INVENTION

The present invention is provided in view of these circumstances. It is an object of the present invention to provide a portable terminal with camera which enables the focal length to be converted using a simple arrangement and which is thus suitable for easily switching between image-capturing of a distant object as with ordinary cameras and image-capturing of an operator's (owner's) face or the like.

In order to attain the above-described object, the present invention is directed to a portable terminal with camera, comprising: a first housing and a second housing which are movably connected to each other; an image pickup device which is arranged in one of the first housing and the second housing; and a conversion lens which is arranged in the other of the first housing and the second housing, wherein in a first state where the first housing and the second housing are laid on each other, the image pickup device and the conversion lens have an identical optical axis so that a focal length of the image pickup device is converted from a focal length in a second state where the first housing and the second housing are arranged to each other different than the first state.

According to the present invention, one of the first housing and the second housing is provided with the image pickup device, and the other of the first housing and the second housing is provided with the conversion lens. The image pickup device and the conversion lens are arranged so that the image pickup device and the conversion lens have the identical optical axis when the first housing and the second housing are laid on each other. When the first housing and the second housing are arranged to each other differently than the first state, the image pickup device operates with no conversion lens. This configuration makes the focal length of the image pickup device variable to enable easy switching between image-capturing of a distant object as with ordinary cameras and image-capturing of an operator's (owner's) face or the like. Therefore, the functions of the camera are significantly improved.

The "conversion lens" is also called the "converter" and is an auxiliary lens connected to a main lens to enable its focal length to be converted. The conversion lens thus produces various effects such as those produced using a telephoto, wide-angle, or fish-eye lens. The present invention employs a front conversion lens to be set in front of the main lens. However, the present invention is not limited to this aspect. It is possible to employ a rear conversion lens to be set in rear of the main lens.

Preferably, the portable terminal with camera further comprises an audio transmitting and receiving device. With the audio transmitting and receiving device, the portable terminal functions as a mobile telephone, thus improving versatility.

Preferably, the portable terminal with camera further comprises another conversion lens changeable with said conversion lens by sliding operation, wherein the focal length of the image pickup device is converted into one of a plurality of lengths by selecting one of the conversion lenses. If the plurality of conversion lenses are provided and can be changeably moved as described above, the focal length can be converted into one of the plurality of lengths to provide modes such as a telephoto, standard, and wide-angle.

Preferably, the conversion lens is a zoom lens. According to this, the degree of freedom of the focal length is further increased. This significantly improves the functions of the camera.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 7(a) and 7(b) are schematic views showing essential parts of another embodiment of the portable terminal with camera.

DETAILED DESCRIPTION OF THE PREFERRED EMBODIMENTS

With reference to the drawings, description will be given of preferred embodiments of a portable terminal with camera according to the present invention. Some portable terminals with camera such as PDAs normally do not have any audio transmitting and receiving devices. However, by way of example, description will be given of a portable terminal with camera such as a mobile telephone provided with an audio transmitting and receiving device, as the preferred embodiments.

The portable terminal with camera 10 is a next-generation mobile telephone constituting a communication system that can transmit and receive audios to and from other portable terminals or can simultaneously transmit and receive audios and images. The portable terminal with camera 10 is based on a wireless access method such as W-CDMA (Wideband Code Division Multiple Access) or cdma2000.

Figure 1:
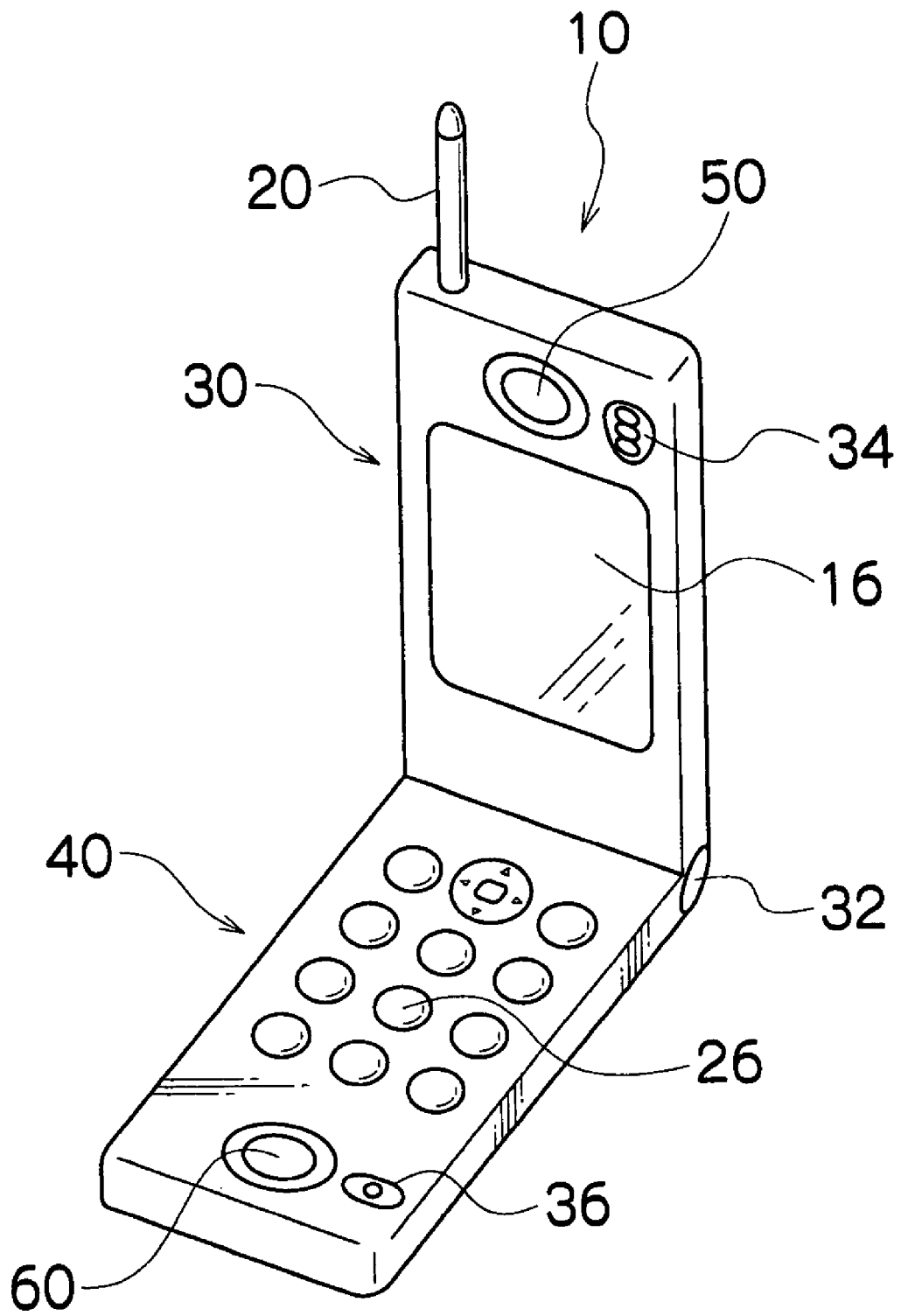
FIG. 1 is a schematic view showing an embodiment of a portable terminal with camera according to an embodiment of the present invention.

As shown in FIG. 1, the portable terminal with camera 10 is configured so that a first housing or a display side housing 30 and a second housing or an operation side housing 40 are connected together through a hinge mechanism 32. A display section 16 including a liquid crystal display element is arranged at the middle of the display side housing 30. An antenna 20 is arranged at the upper left end of the display side housing 30. A speaker 34 is arranged at the upper right of the display side housing 30 and acts as an earpiece of telephone. A key input section 26 including various buttons is arranged at the middle of the operation side housing 40. A microphone 36 is arranged at the lower right of the operation side housing 40 and acts as a mouthpiece of telephone.

The above arrangements are similar to those of the presently most common portable terminals on the market. Accordingly, further description of the constituent members is omitted.

Figure 3:
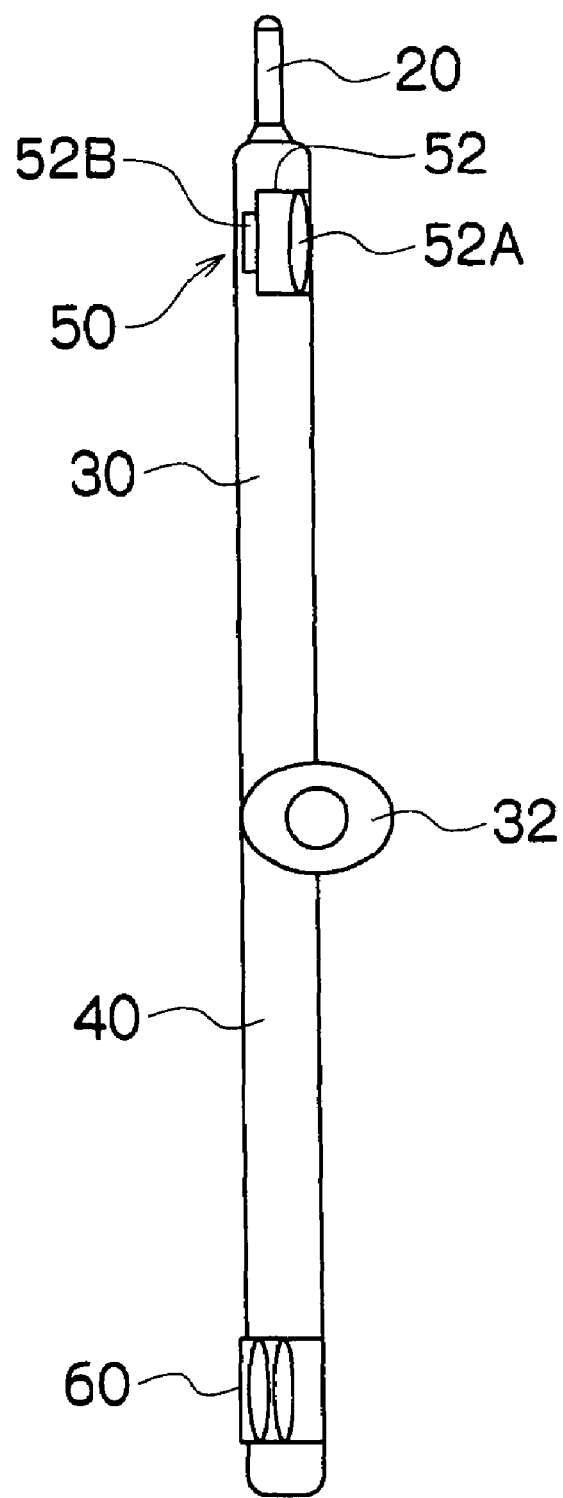
FIG. 3 is a sectional view of the portable terminal with camera in an unfolded state.

In a normal operation, the portable terminal with camera 10 is operated so that the display side housing 30 and the operation side housing 40 are unfolded as shown in FIG. 3. While out of operation, the display side housing 30 and the operation side housing 40 are folded up as shown in FIG. 4.

In addition to the above arrangements, the portable terminal with camera 10 according to the embodiment of the present invention is provided with a digital camera 50 and a conversion lens 60. An image pickup section 52 of the digital camera 50 is arranged near the center of the upper part of the display side housing 30 as the first housing. The conversion lens 60 is arranged near the center of the lower part of the operation side housing 40 as the second housing. The image pickup section 52 and the conversion lens 60 of the digital camera 50 are arranged so that the image pickup section 52 and the conversion lens 60 have substantially the identical optical axis when the display side housing 30 and the operation side housing 40 are folded up and laid together as shown in FIG. 4.

As shown in FIG. 3, the image pickup section 52 is composed of a lens 52A and an image pickup element such as a CCD 52B arranged behind the lens 52A. The image pickup section 52 constitutes a part of the digital camera 50. In the state shown in FIG. 3, an image of a distant object can be captured as with ordinary cameras. In this case, a rear display section 46 (see FIG. 2) functions as a viewfinder.

Figure 2:
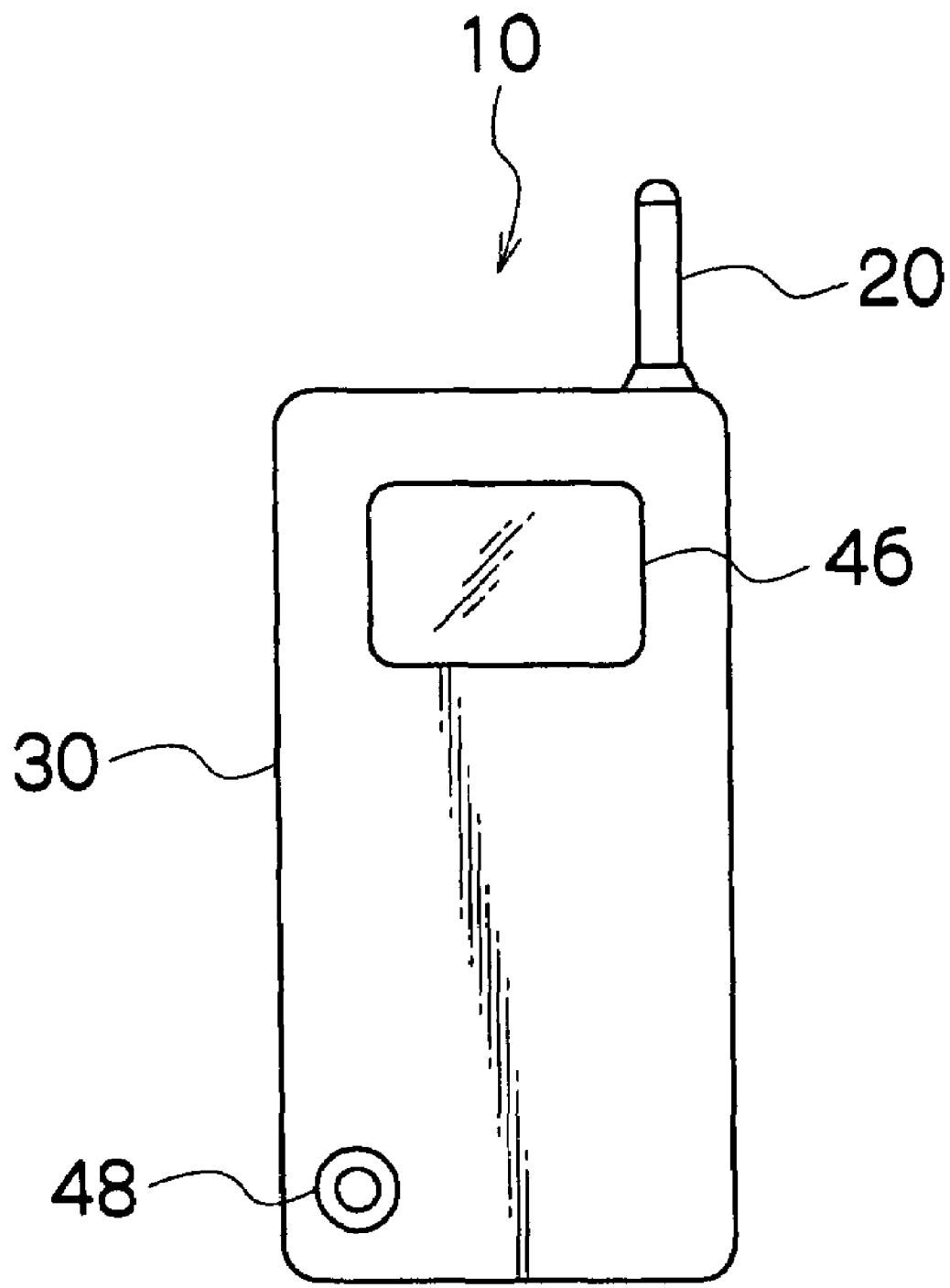
FIG. 2 is a rear view of a first housing of the portable terminal.
Figure 4:
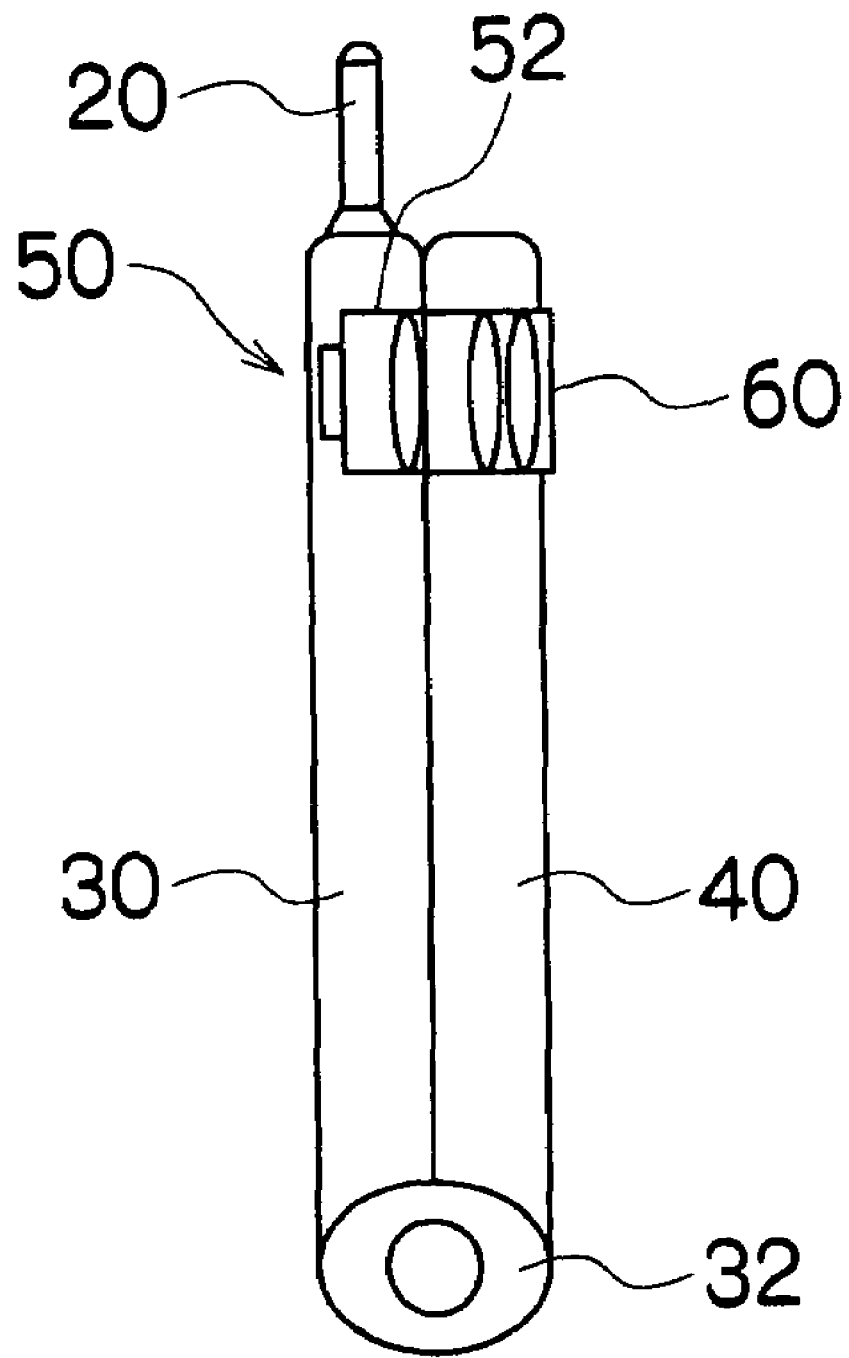
FIG. 4 is a sectional view of the portable terminal with camera in a folded state.

On the other hand, when an image of the operator's (owner's) face or the like is captured, this can be achieved in the state shown in FIG. 4 where the display side housing 30 and the operation side housing 40 are folded up. An image-capturing operation can be performed using an image-capturing button 48 provided on the rear surface of the display side housing 30 as shown in FIG. 2. Since the conversion lens 60 is disposed in the front of the image pickup section 52 as shown in FIG. 4, the focal length of the image pickup section 52 can be varied to set a close-up or wide-angle state desired by the user. Therefore, a desirable image can be captured.

Figure 5:
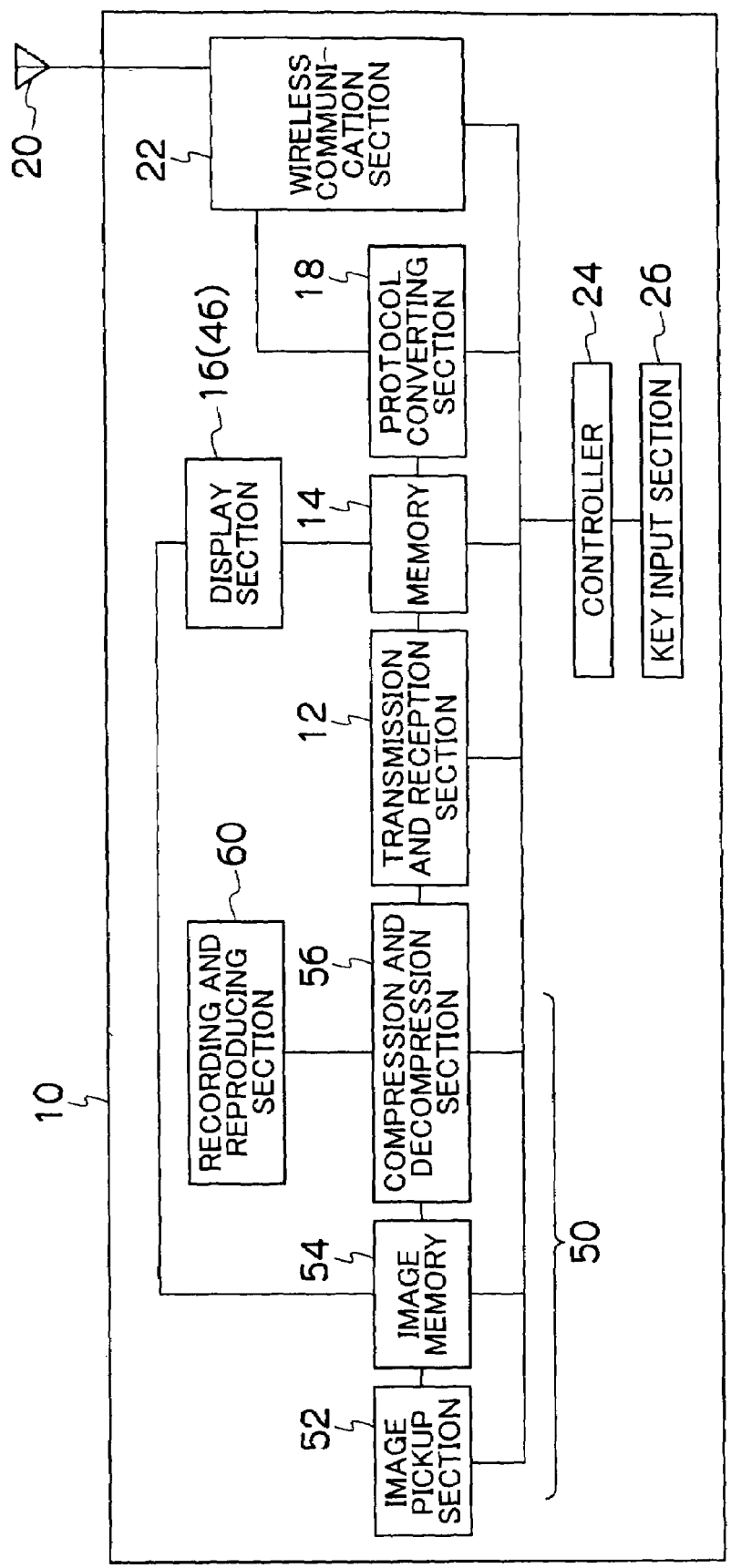
FIG. 5 is a block diagram showing the configuration of the embodiment of the portable terminal with camera.

FIG. 5 is a diagram showing the configuration of the embodiment of the portable terminal with camera 10. As shown in FIG. 5, the portable terminal with camera 10 is composed of a transmission and reception section 12, a memory 14, the display section 16, a protocol converting section 18, a wireless communication section 22 having the antenna 20, a controller 24, the key input section 26, and other sections. The microphone 36, the speaker 34, and others are provided to allow the portable terminal 10 as an ordinary mobile telephone, but are omitted from FIG. 5.

The digital camera 50 contained in the portable terminal 10 is composed of the image pickup section 52, having the lens 52A and the image pickup element such as the CCD 52B which is behind the lens 52A, as shown in FIG. 3, an image memory 54, a compression and decompression processing section 56, the image display sections 16 and 46, the conversion lens 60, the controller 24, the key input section 26, and other sections.

The display sections 16 and 46 of the portable terminal 10 also serve as the image display section of the digital camera 50, and the controller 24 and the key input section 26 of the portable terminal 10 also serve as the controller and the key input section of the digital camera 50.

The protocol converting section 18 is a processing block that converts data to be transmitted, in accordance with a predetermined communication protocol. The converted data is transmitted to the wireless communication section 22. The wireless communication section 22 is a processing section that converts the transmitted data received from the protocol converting section 18 into a predetermined communication signal, and decodes data received via the antenna 20.

The controller 24 is a control processing section that controls each circuit block in the portable terminal with camera 10, on the basis of instruction signals inputted through the key input section 26.

The key input section 26 is a block including operation keys (buttons) such as ten keys included in ordinary mobile telephones. In addition to the keys used in ordinary mobile telephones, the key input section 26 can also be provided with a video transmission key that is an exclusive video transmission switch. Moreover, as already described, in addition to the key input section 26, the image-capturing button 48 is provided (see FIG. 4) to allow an image-capturing operation to be performed.

Figure 6:
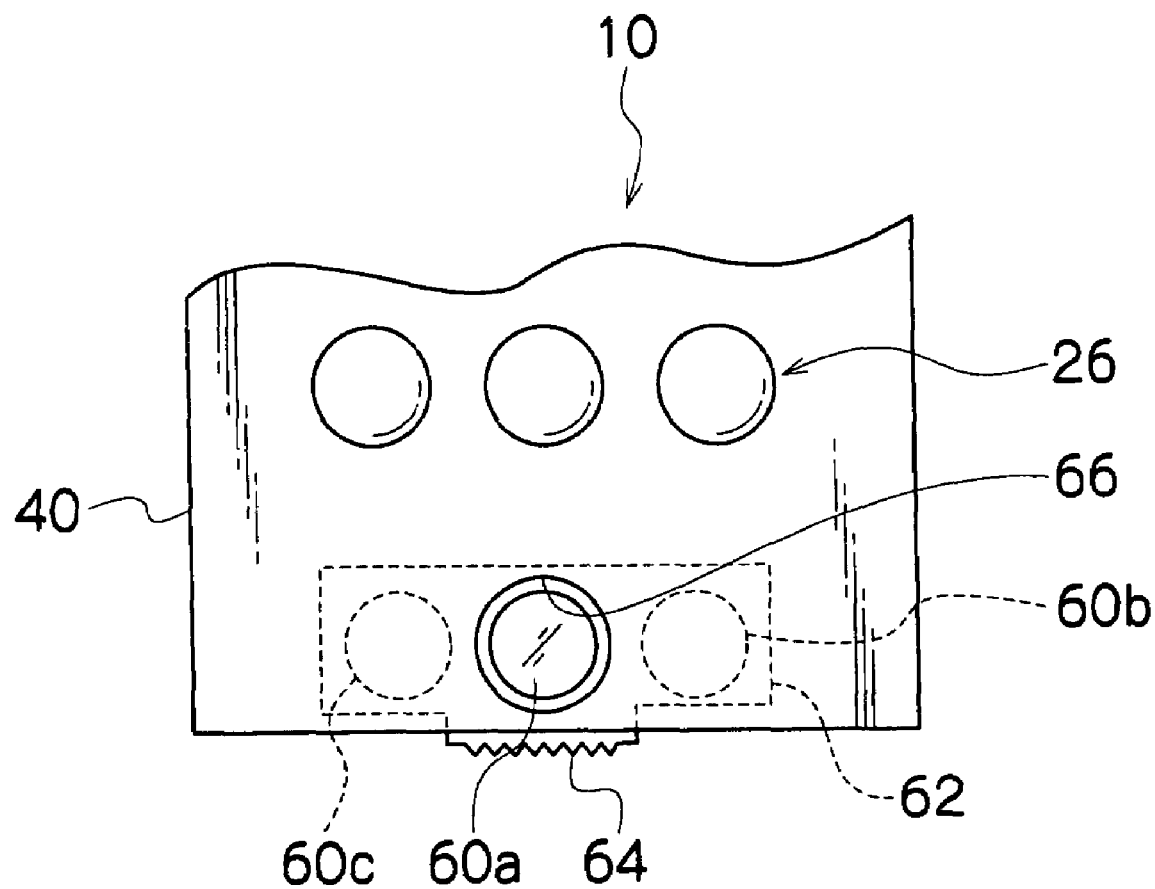
FIG. 6 is a plan view showing essential parts of another embodiment of the portable terminal with camera.

Another embodiment of the conversion lens 60 will be described with reference to FIG. 6 showing essential parts of the portable terminal with camera 10. A portion in which the conversion lens 60 is provided is enlarged. In FIG. 6, three conversion lenses 60 (60a, 60b, and 60c) are provided and arranged in a line on a lens fixation plate 62 in a lateral direction.

A through-hole 66 is formed in the same areas of the opposite surfaces (front and rear surfaces) of the operation side housing 40. One of the conversion lenses 60a, 60b, and 60c can be arranged in the through-hole 66. Specifically, the lens fixation plate 62 is supported slidably in the lateral direction inside the operation side housing 40. An operation projection 64 is projectingly provided in the central portion of the bottom side of the lens fixation plate 62, and is operated with the user's finger or the like to slide the lens fixation plate 62.

The arrangement in FIG. 6 is provided with the three conversion lenses 60 (60a, 60b, and 60c). Thus, for example, the image pickup section 52 in the image-capturing state shown in FIG. 3 where the conversion lens 60 is not used is defined as the standard state, the conversion lens 60a can be designed so that the case where the conversion lens 60a is used in the folded state shown in FIG. 4 is a wide-angle state, the conversion lens 60b can be designed so that the case where the conversion lens 60a is used in the folded state shown in FIG. 4 is a telephoto state, and the conversion lens 60c can be designed so that the case where the conversion lens 60a is used in the folded state shown in FIG. 4 is a fish-eye state.

If it is cumbersome to set the image-capturing state shown in FIG. 3 if the conversion lens 60 is not used, while setting the image-capturing state shown in FIG. 4 where the housings 30 and 40 are folded up if the conversion lens 60 is used, then for example, the conversion lens 60a may be omitted and a corresponding part of the lens fixation plate 62 may be a through-hole. Then, the folded arrangement shown in FIG. 4 may be employed in all the image-capturing states. In this case, conveniently, the rear surface section 46 (see FIG. 2) may always be used as the viewfinder.

FIGS. 7(a) and 7(b) are schematic views showing another embodiment of the portable terminal with camera according to the present invention. Members that are the same as or similar to those in the arrangements shown in FIGS. 1 to 5 are denoted by similar reference numerals, and their description is omitted.

The portable terminal with camera 10 shown in FIGS. 7(a) and 7(b) employs sliding housings different from ordinary folded housings. Specifically, the portable terminal with camera 10 is composed of the first housing 30 and the second housing 40 slidably connected together. That is, by sliding the second housing 40 in the direction of an arrow in FIG. 7(a), the housed state shown in FIG. 7(a) is changed to the operating state shown in FIG. 7(b).

The first housing 30 is provided not only with the display section 16 but also with the key input section 26. The second housing 40 functions mainly as a cover member. The constituent members of the first housing 30 can be electrically connected to the corresponding constituent members of the second housing 40 using a flexible substrate or the like (not shown).

As shown in FIG. 7(b), the image pickup section 52 of the digital camera 50 is arranged at a position corresponding to one-third of the length of the first housing 30 from its upper end and in the right of the first housing 30. The conversion lens 60 is arranged at the corresponding portion of the second housing 40. The image pickup section 52 of the digital camera 50 and the conversion lens 60 are arranged so that the image pickup section 52 and the conversion lens 60 have substantially the identical optical axis when the second housing 40 is laid on the first housing 30 as shown in FIG. 7(a).

In the state shown in FIG. 7(b), an image of a distant object can be captured as with ordinary cameras. On the other hand, when an image of the operator's (owner's) face or the like is captured, this can be accomplished in the state shown in FIG. 7(a). An image-capturing operation can be performed using an image-capturing button (not shown). Since the conversion lens 60 is disposed in the front of the image pickup section 52, the focal length of the image pickup section 52 can be varied to set a close-up or wide-angle state desired by the user. Therefore, a desirable image is captured.

In FIGS. 7(a) and 7(b), instead of the configuration in which the first housing 30 is provided with the image pickup section 52 of the digital camera 50 and the second housing 40 is provided with the conversion lens 60, the opposite configuration may be employed. For example, as shown by broken lines in FIGS. 7(a) and 7(b), it is possible to employ a configuration in which the image pickup section 52 of the digital camera 50 is provided near the center of the lower part of the second housing 40 so as to face downward, whereas the conversion lens 60 is provided in the corresponding area of the first housing 30 near the center of its lower part.

Description has been given of the embodiments of the portable terminal with camera according to the present invention. The present invention is not limited to the above embodiments but various other embodiments are possible. For example, in the embodiments shown in FIGS. 1 and 6, the conversion lenses are of a fixed focus type. However, it is possible to employ a configuration in which one of the conversion lenses is a zoom lens. It is also possible to employ a configuration in which an image pickup section using no conversion lens is set in a close-up or wide-angle state, and a conversion lens is used to provide the image pickup section 52 with a longer focal length.

In the embodiment shown in FIG. 6, the lens fixation plate 62 is supported so as to be slidable in the lateral direction inside the operation side housing 40. However, the lens fixation plate 62 may be formed like a turret (a rotary type) so that it is supported so as to be rotatable inside the operation side housing 40.

In the embodiment shown in FIG. 2, the rear display section 46 is arranged on the rear surface of the display side housing 30 as the first housing. However, the rear display section 46 may be arranged on the rear surface of the second housing 40 or may be omitted.

The portable terminal with camera 10 in the above-described embodiments is provided with the image pickup device and the image transmitting device. However, the image transmitting device may be omitted. This is because even without the image transmitting device, the minimum required functions of the portable terminal with camera can be provided using the audio transmitting and receiving device and the image pickup device.

The portable terminal with camera may be a Personal Digital Assistant (PDA) provided with no audio transmitting and receiving device.

As described above, according to the present invention, one of the first housing and second housing is provided with the image pickup section of the image pickup device, and the other of the first housing and second housing is provided with the conversion lens. The image pickup section of the image pickup device and the conversion lens are arranged so that when the first housing and second housing are laid on top of each other, the image pickup section and the conversion lens share substantially the same optical axis. This makes the focal length of the image pickup section variable to enable easy switching between image-capturing of a distant object as with ordinary cameras and image-capturing of an operator's (owner's) face or the like. Therefore, the functions of the camera are significantly improved.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A portable terminal with camera, comprising:
    a first housing and a second housing which are movably connected to each other;
    an image pickup device which is arranged in one of the first housing and the second housing; and
    a first refractive conversion lens which is arranged in the other of the first housing and the second housing,
    wherein in a first state where the first housing and the second housing are laid on each other, the image pickup device and the refractive conversion lens have an identical optical axis so that a focal length of the image pickup device is converted from a focal length in a second state where the first housing and the second housing are arranged to each other differently than the first state,
    said portable terminal further comprising a second refractive conversion lens, and means for replacing said first refractive conversion lens with said second refractive conversion lens,
    wherein said first and second refractive conversion lenses are mounted on a holder in the other of the first housing and the second housing, and
    wherein said second refractive conversion lens is exchangeable with said first refractive conversion lens by a sliding operation of said holder.

2. The portable terminal with camera as defined in claim 1, wherein the focal length of the image pickup device is converted into one of a plurality of lengths by selecting one of the first and second refractive conversion lenses.

3. The portable terminal with camera as defined in claim 2, further comprising an audio transmitting and receiving device.

4. The portable terminal with camera as defined in claim 2, wherein the first refractive conversion lens is a zoom lens.

5. The portable terminal as defined in claim 2, wherein said first and second housings are connected to each other by a hinge mechanism.

6. The portable terminal as defined in claim 2, wherein said first and second housings are slidably connected together.

7. The portable terminal as defined in claim 2, further comprising a third refractive conversion lens exchangeable, by the sliding operation, with said first and second refractive conversion lenses, and wherein the focal length of the image pickup device is converted into one of said plurality of lengths by selecting one of said first, second and third refractive conversion lenses.

8. The portable terminal as defined in claim 7, wherein said first, second and third refractive conversion lenses are discrete elements physically and optically separate from each other.

9. The portable terminal as defined in claim 1, wherein said first and second refractive conversion lenses are discrete elements physically and optically separate from each other.

10. The portable terminal as defined in claim 1, further comprising an image-capturing button on a rear surface of one of said first and second housings.

11. The portable terminal as defined in claim 1, wherein a rear surface section of one of said first and second housings contains a viewfinder.

12. The portable terminal as defined in claim 1, wherein at least said first refractive conversion lens is selected from the group consisting of a fish-eye lens, a wide-angle lens, and a close-up lens.

13. A portable terminal with camera, comprising:
    a first housing and a second housing which are movably connected to each other;
    an image pickup device which is arranged in one of the first housing and the second housing; and
    a first refractive conversion lens which is arranged in the other of the first housing and the second housing,
    wherein in a first state where the first housing and the second housing are laid on each other, the image pickup device and the refractive conversion lens have an identical optical axis so that a focal length of the image pickup device is converted from a focal length in a second state where the first housing and the second housing are arranged to each other differently than the first state,
    said portable terminal further comprising a second refractive conversion lens, and means for replacing said first refractive conversion lens with said second refractive conversion lens,
    wherein said first and second refractive conversion lenses are mounted on a rotatable turret, and
    said second refractive conversion lens is exchangeable with said first refractive conversion lens by a rotation operation.

* * * * *